(12) United States Patent
Lu (10) Patent No.: US 11,369,869 B2
(45) Date of Patent: Jun. 28, 2022

(54) GAME CONTROLLER

(71) Applicant: DEXIN CORPORATION, New Taipei (TW)

(72) Inventor: Ho-Lung Lu, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/308,218

(22) Filed: May 5, 2021

(65) Prior Publication Data
US 2022/0080300 A1   Mar. 17, 2022

(30) Foreign Application Priority Data

Sep. 11, 2020   (TW) .................................. 109131221

(51) Int. Cl.
*A63F 13/24*   (2014.01)

(52) U.S. Cl.
CPC .................................. *A63F 13/24* (2014.09)

(58) Field of Classification Search
None
See application file for complete search history.

(56) References Cited

U.S. PATENT DOCUMENTS

| | | | | |
|---|---|---|---|---|
| 8,064,827 B2 * | 11/2011 | Hino | ........................ | A63F 13/79 713/153 |
| 9,711,980 B2 * | 7/2017 | Hodges | ................. | H02J 7/0027 |
| 2003/0071783 A1 * | 4/2003 | Chen | ........................ | G06F 3/039 345/156 |
| 2005/0170889 A1 * | 8/2005 | Lum | ...................... | H04W 84/22 463/39 |
| 2009/0111508 A1 * | 4/2009 | Yeh | ........................ | G06F 1/1624 455/575.8 |
| 2010/0144436 A1 * | 6/2010 | Marks | ...................... | G06F 3/016 715/702 |
| 2012/0058821 A1 * | 3/2012 | Lan | .......................... | A63F 13/92 463/30 |
| 2013/0084796 A1 * | 4/2013 | Kerr | ...................... | G06F 1/1654 455/39 |

(Continued)

FOREIGN PATENT DOCUMENTS

| | | |
|---|---|---|
| EP | 3103533 A2 | 12/2016 |
| TW | M601131 U | 9/2020 |

*Primary Examiner* — Tramar Harper
(74) *Attorney, Agent, or Firm* — Li & Cai Intellectual Property (USA) Office (57) ABSTRACT

A game controller includes a first handle body. The first handle body includes a first operation interface, a first connection portion, a first control circuit, a first battery, and a first communication module. The first operation interface is electrically connected to the first connection portion. The first communication module includes a first wireless communication circuit and a first wired communication circuit. The first control circuit is electrically connected to the first communication module, the first battery, the first operation interface and the first connection portion. The first mobile device is disposed at a side of the first handle body. When the first mobile device is electrically connected to the first connection portion of the first handle body, the first control circuit turns on the first wired communication circuit of the first communication module to communicate with the first mobile device by the first connection portion.

9 Claims, 8 Drawing Sheets

(56) References Cited

U.S. PATENT DOCUMENTS

| | | | |
|---|---|---|---|
| 2016/0243437 A1* | 8/2016 | Masarik | A63F 13/24 |
| 2016/0361627 A1* | 12/2016 | Fujita | A63F 13/98 |
| 2018/0345130 A1* | 12/2018 | Wells | A63F 13/24 |
| 2021/0223825 A1* | 7/2021 | Seiler | G06F 1/1616 |
| 2021/0299553 A1* | 9/2021 | Lu | A63F 13/24 |
| 2021/0370164 A1* | 12/2021 | Lu | A63F 13/235 |

* cited by examiner

GAME CONTROLLER

CROSS-REFERENCE TO RELATED PATENT APPLICATION

This application claims the benefit of priority to Taiwan Patent Application No. 109131221, filed on Sep. 11, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a game controller, and more particularly to a game controller having a plurality of usage scenarios.

BACKGROUND OF THE DISCLOSURE

Most game controllers are charged and are connected to mobile devices in a relatively monotonous manner.

Therefore, providing a game controller capable of being used in a variety of scenarios has become one of the important issues in the industry.

SUMMARY OF THE DISCLOSURE

In response to the above-referenced technical inadequacies, the present disclosure provides a game controller. The game controller is coupled to a first mobile device. The game controller includes a first handle body. The first handle body includes a first operation interface, a first connection portion, a first control circuit, a first battery, and a first communication module. The first operation interface is electrically connected to the first connection portion. The first communication module includes a first wireless communication circuit and a first wired communication circuit. The first control circuit is electrically connected to the first communication module, the first battery, the first operation interface and the first connection portion. The first mobile device is disposed at a side of the first handle body. When the first mobile device is electrically connected to the first connection portion of the first handle body, the first control circuit turns on the first wired communication circuit of the first communication module to communicate with the first mobile device by the first connection portion.

Therefore, the game controller provided by the present disclosure can be electrically connected to a mobile device to receive power and communicate with the mobile device. In addition, without being electrically connected to the mobile device, the game controller can still communicate with the mobile device, thereby expanding usage scenarios provided to a user. Furthermore, the game controller of the present disclosure can also be charged by the handle body at one side and be controlled by the handle body on another side. In addition, the two handheld bodies of the game controller of the present disclosure can each be paired with one mobile device. Information can also be transmitted between the two handle bodies. All of the above can greatly increase the usage scenarios of the game controller.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
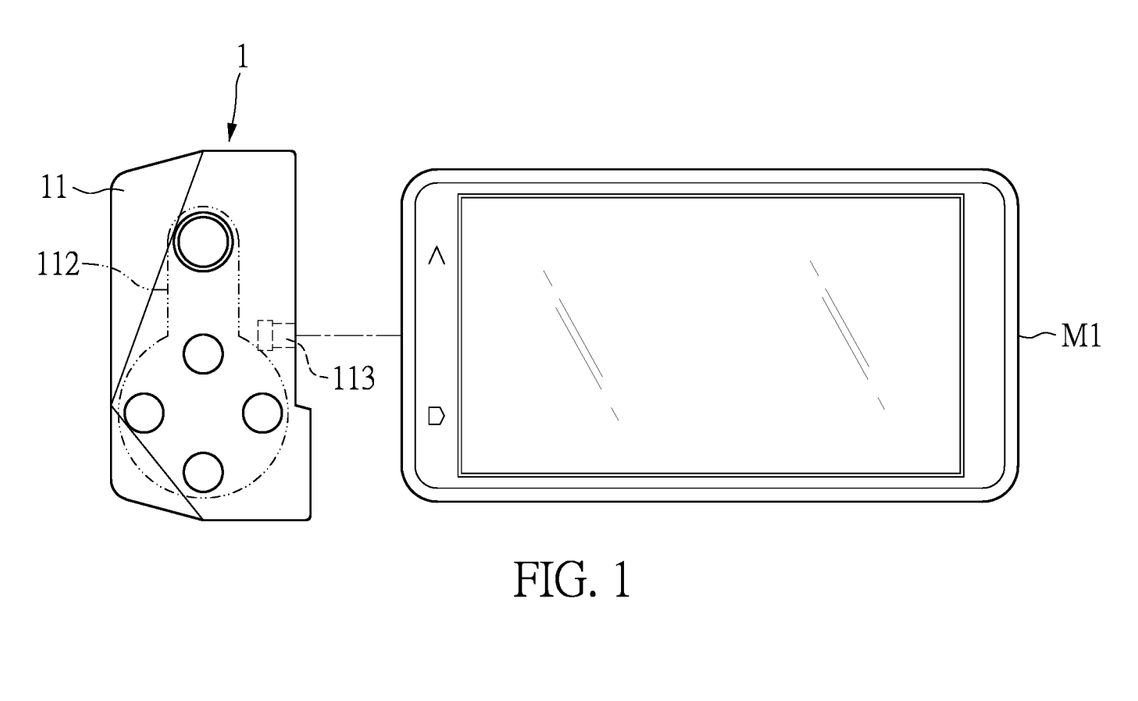
FIG. 1 is a schematic view of a game controller being used with a first mobile device according to a first embodiment of the present disclosure.
Figure 2:
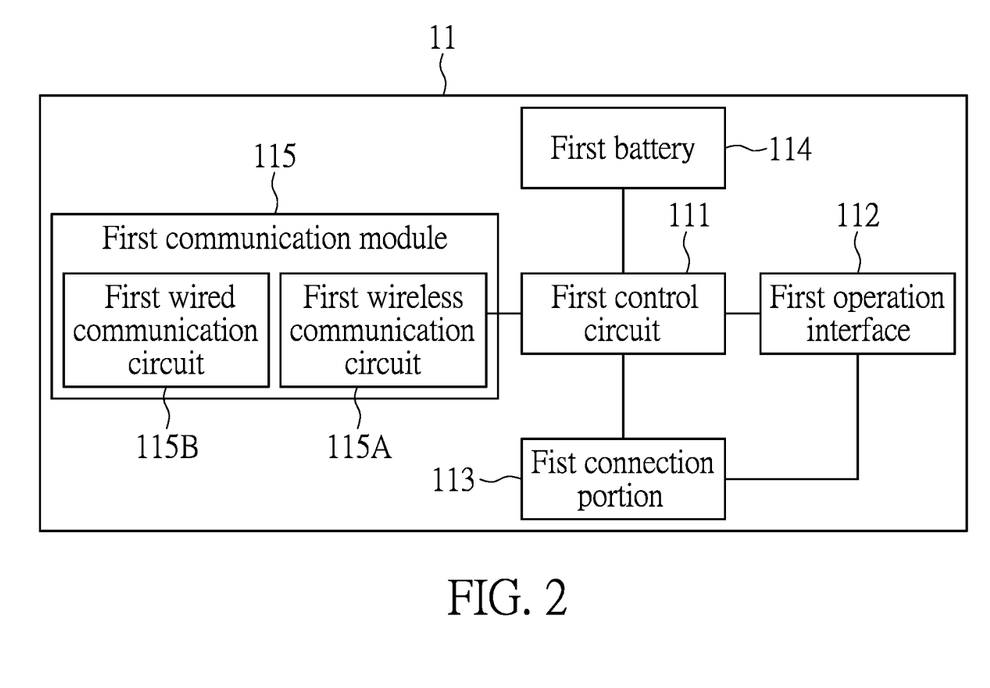
FIG. 2 is a functional block diagram of a first handle body according to the first embodiment of the present disclosure.

Referring to FIG. 1 and FIG. 2, FIG. 1 is a schematic diagram of a game controller used with a first mobile device according to a first embodiment of the present invention. FIG. 2 is a functional block diagram of a first handle body according to the first embodiment of the present disclosure.

A game controller 1 is connected to a first mobile device M1. The game controller 1 at least includes a first handle body 11.

The first handle body 11 includes a first control circuit 111, a first operation interface 112, a first connection portion 113, a first battery 114, and a first communication module 115. The first operation interface 112 is electrically connected to the first connection portion 113.

The first communication module 115 includes a first wireless communication circuit 115A and a first wired communication circuit 115B. The first control circuit 111 is electrically connected to the first communication module 115, the first battery 114, the first operation interface 112, and the first connection portion 112.

In this embodiment, the first mobile device M1 can be disposed at a side of the first handle body 11. The first handle body 11 has an accommodation space that has the first connection portion 113 disposed therein and can accommodate the first mobile device M1.

When the first mobile device M1 is electrically connected to the first connection portion 113 of the first handle body 11, the first control circuit 111 turns on the first wired communication circuit 115B of the first communication module 115 to communicate with the first mobile device M1 by the first connection portion 113. In other words, the first handle body 11 is in communication with the first mobile device M1 by the first wired communication circuit 115B and the first connection portion 113. The first mobile device M1 is capable of charging the first battery 114 of the first handle body 11 by the first connection portion 113. In other words, when the first mobile device M1 communicates with the first handle body 11 of the game controller 1 in a wired manner, the first mobile device M1 can charge the first battery 114 of the first handle body 11. In addition, control signals from the first operation interface 112 of the first handle body 11 can be transmitted to the first mobile device M1 for operation and control.

The first control circuit 111 is a central processing unit (CPU), an application specific integrated circuit (ASIC) or a microprocessor The first wireless communication circuit 115A is a WI-FI communication unit, a BLUETOOTH communication unit, a ZIGBEE communication unit, a LoRa communication unit, a Sigfox communication unit or an NB-IoT communication unit. The first battery 114 is a lithium ion battery, a lithium manganese battery, a lithium polymer battery, or a nickel hydrogen battery.

When the first mobile device M1 is not electrically connected to the first connection portion 113, a mobile communication module M1-1 of the first mobile device is capable of communicating with the first wireless communication circuit 115A of the first communication module 115 of the first handle body 11.

In addition, the first connection portion 113 is replaceable or detachable in this embodiment.

Second Embodiment

Figure 3:
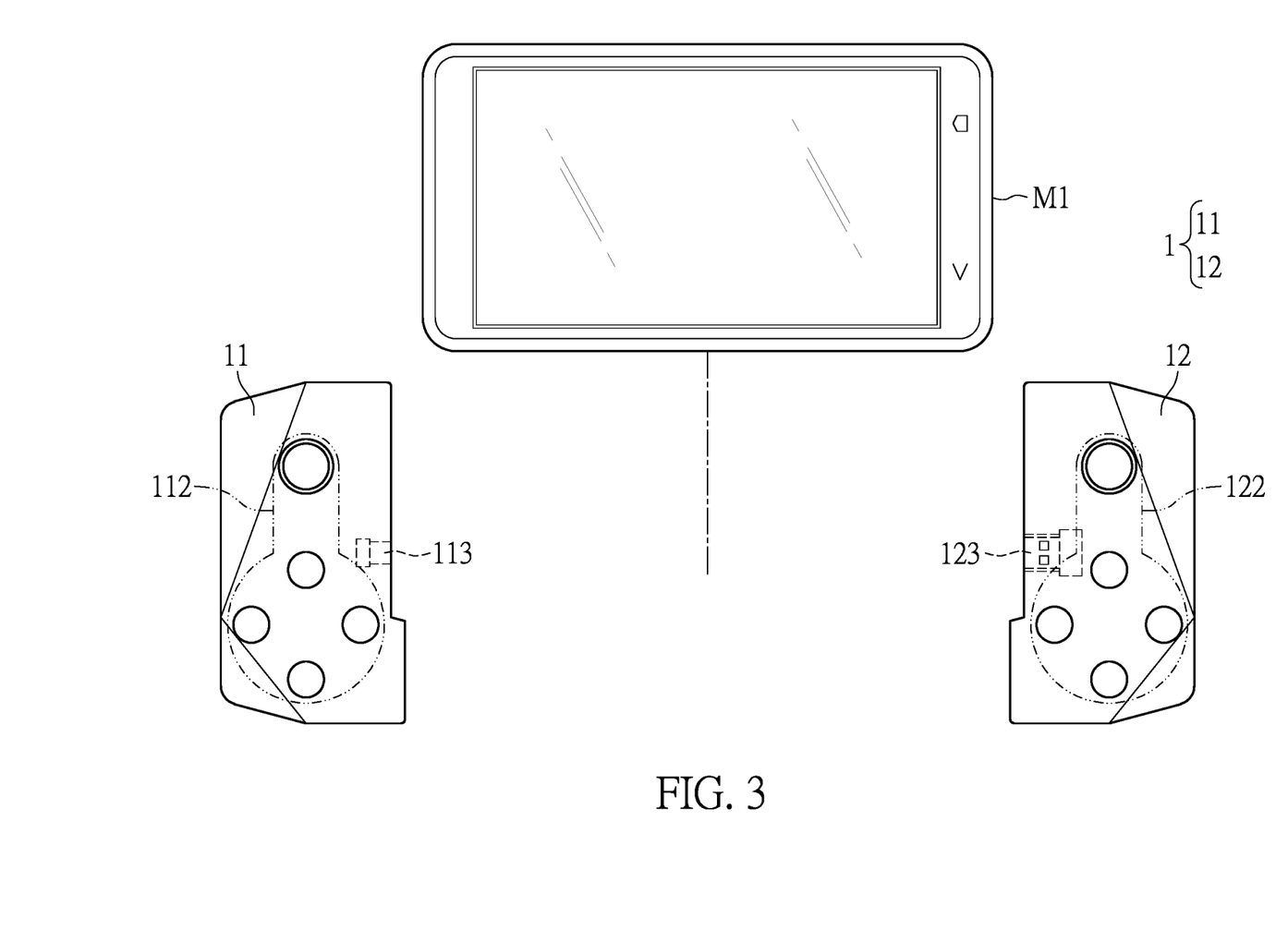
FIG. 3 is a schematic view of the game controller cooperating with the first mobile device according to a second embodiment of the present disclosure.
Figure 4:
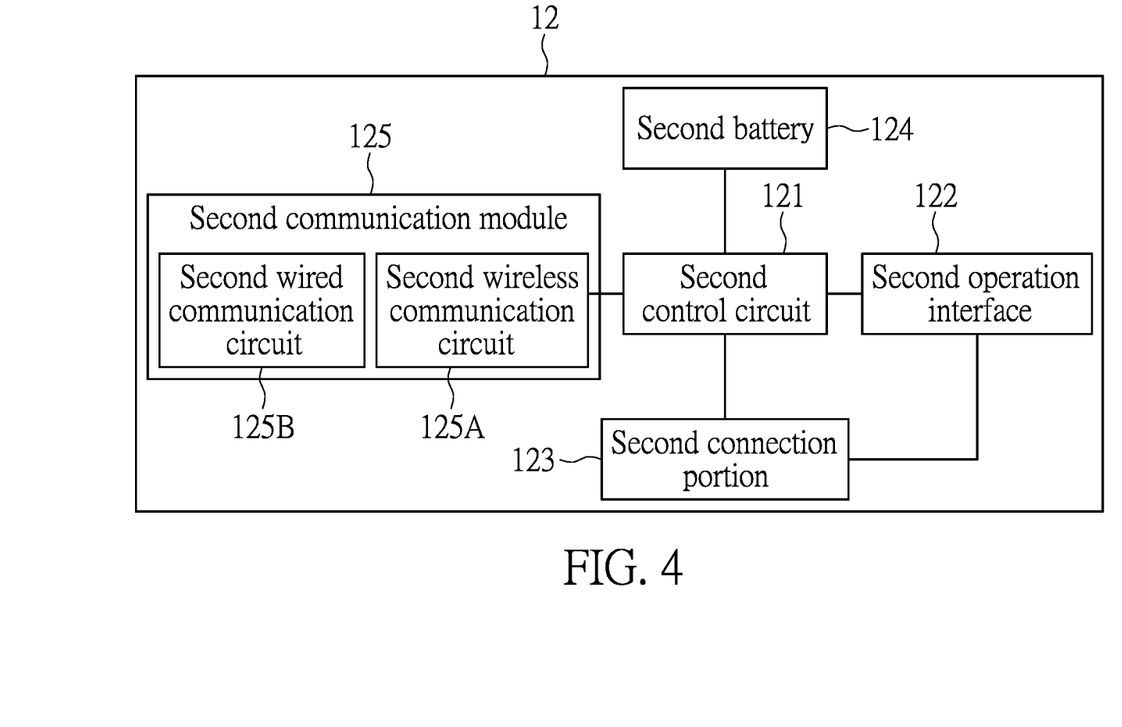
FIG. 4 is a functional block diagram of a second handle body according to the second embodiment of the present disclosure.

Referring to FIG. 3 and FIG. 4, FIG. 3 is a schematic view of the game controller according to a second embodiment of the present disclosure cooperating with the first mobile device. FIG. 4 is a functional block diagram of a second handle body according to the second embodiment of the present disclosure.

The game controller 1 further includes a second handle body 12. The second handle body 12 is coupled to the first handle body 11. In this embodiment, the first handle body 11 is capable of being coupled to the second handle body 12 in an electrical connection manner or in a communication connection manner. In this embodiment, a structure and functions of the second handle body 12 are similar to those of the first handle body 11, and will not be reiterated herein.

The first mobile device M1 is disposed between the first handle body 11 and the second handle body 12.

The second handle body 12 includes a second control circuit 121, a second operation interface 122, a second connection portion 123, a second battery 124, and a second communication module 125. The second operation interface 122 is electrically connected to the second connection portion 123. The second communication module 125 includes a second wireless communication circuit 125A and a second wired communication circuit 125B. The second control circuit 121 is electrically connected to the second communication module 125, the second battery 124, the second operation interface 122, and the second connection portion 123.

Figure 5:
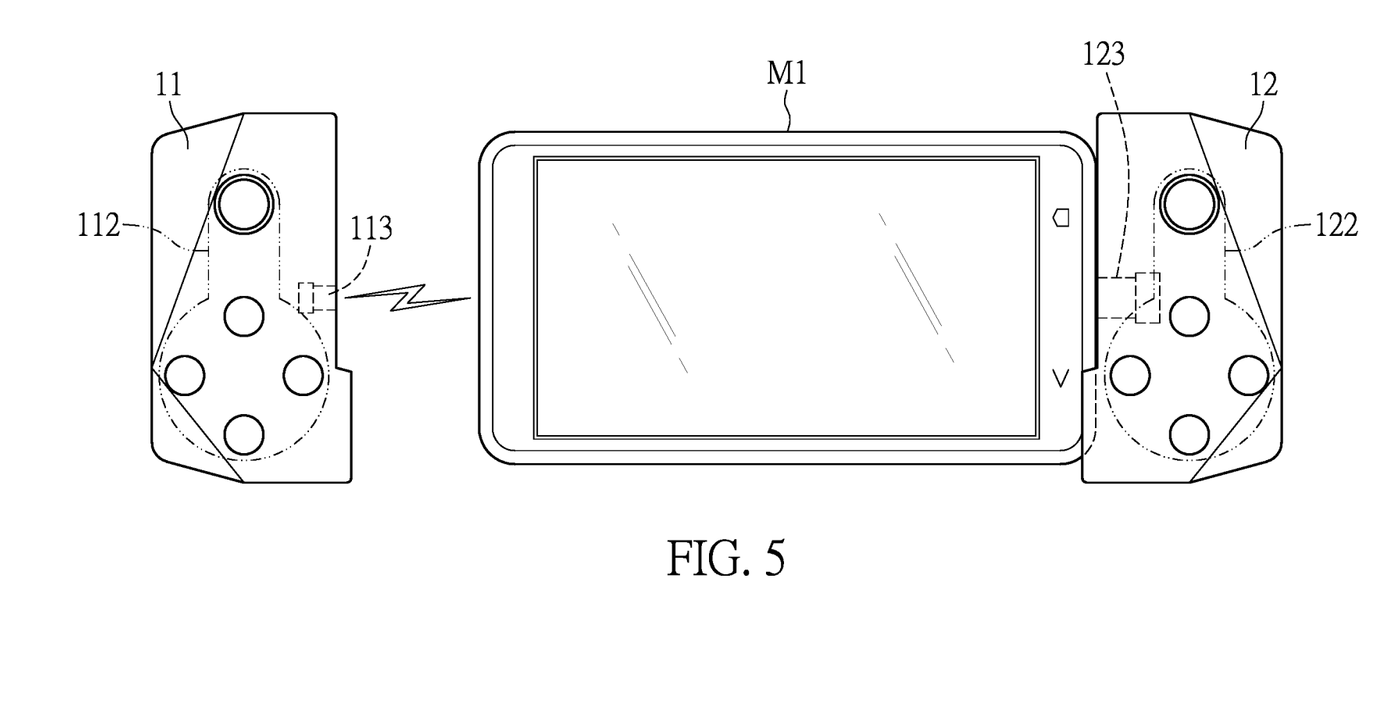
FIG. 5 is a schematic view of the first handle body and the second handle body of the game controller cooperating with the first mobile device for charging and communication according to the second embodiment of the present disclosure.

Referring to FIG. 5, FIG. 5 is a schematic view of a first handle body and the second handle body of the game controller according to the second embodiment of the present disclosure cooperating with the first mobile device to charge and to be in communication therewith.

When a power value of the first battery 114 of the first handle body 11 is lower than a predetermined power value, and the first handle body 11 is electrically connected to the first mobile device M1 by the first connection portion 113, the first mobile device M1 charges the first battery 114, and the first control circuit 111 turns off the first wired communication circuit 115B and the first wireless communication circuit 115A of the first communication module 115. The second handle body 12 is in communication with the first mobile device M1 by the second wireless communication circuit 125A of the second communication module 125. In other words, the first handle body 11 cannot transmit the control signals to the mobile device M1. Only the second handle body 12 can transmit the control signals to the first mobile device M1 in a wireless communication manner.

Figure 6:
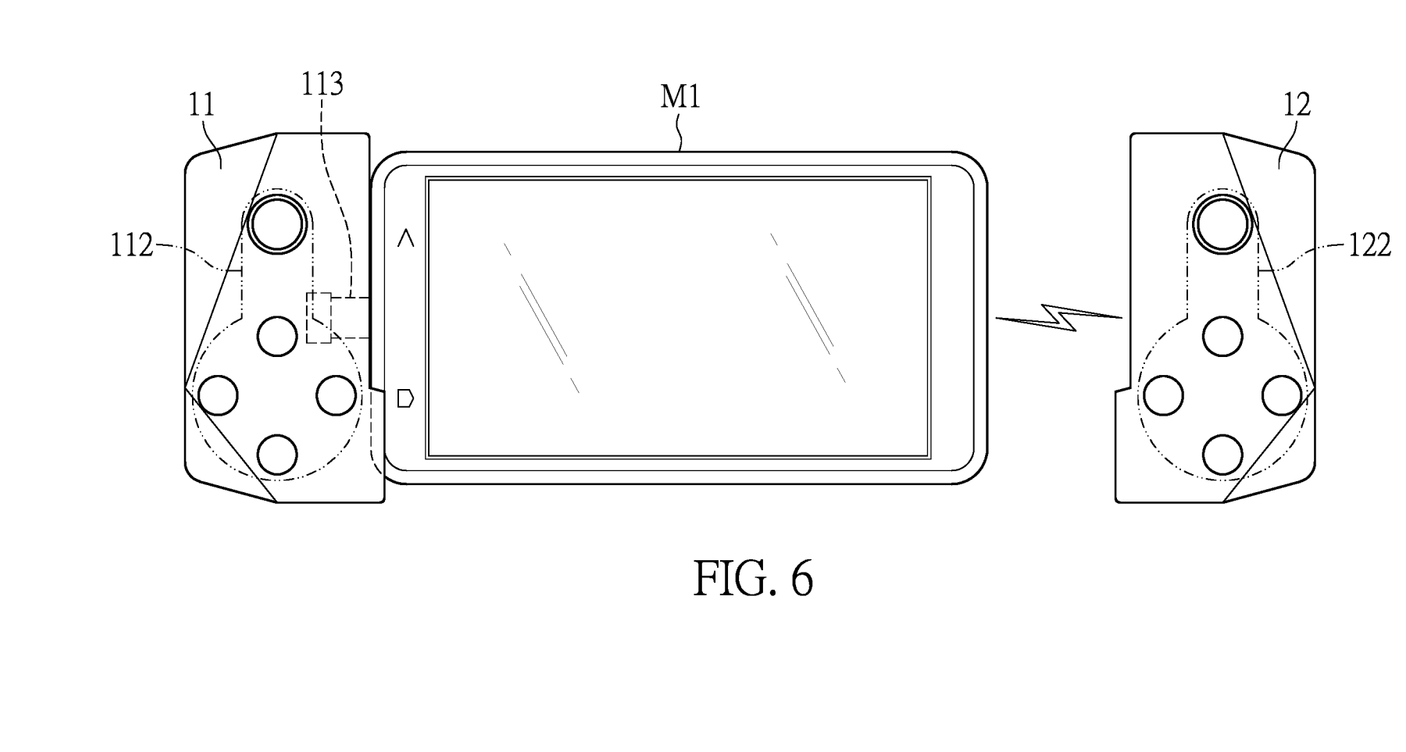
FIG. 6 is another schematic view of the first handle body and the second handle body of the game controller cooperating with the first mobile device for charging and communication according to the second embodiment of the present disclosure.

Referring to FIG. 6, FIG. 6 is another schematic view of the first handle body and the second handle body of the game controller according to the second embodiment of the present disclosure cooperating with the first mobile device to charge and to be in communication therewith.

Similarly, when a power value of the second battery 124 of the second handle body 12 is lower than a predetermined power value, and the second handle body 12 is electrically connected to the first mobile device M1 by the second connection portion 123, the first mobile device M1 charges the second battery 124, and the second control circuit 121 turns off the second wired communication circuit 125B and the second wireless communication circuit 125A of the second communication module 125. The first handle body 11 is in communication with the first mobile device M1 by the first wireless communication circuit 115A of the first communication module 115. In other words, the second handle body 12 cannot transmit the control signals to the mobile device M1. Only the first handle body 11 can transmit the control signals to the first mobile device M1 in a wireless communication manner.

In this embodiment, the predetermined power value can be 10% or 20% of the highest power. The predetermined power value can be set according to actual requirements, and is not limited in the present disclosure.

In other embodiments, when the first mobile device M1 charges the first battery 114, the first control circuit 111 can turn off only the first wired communication circuit 115B of the first communication module 115, and communicate with the second wireless communication circuit 125A of the second handle body 12 by the first wireless communication circuit 115A, so as to transmit the control signals to the second control circuit 121 of the second handle body 12. Then, the control signals are transmitted to the first mobile device M1 by the second wireless communication circuit 125A for operation and control.

Similarly, when the first mobile device M1 charges the second battery 124, the second control circuit 121 can turn off only the second wired communication circuit 125B of the second communication module 125, and communicate with the first wireless communication circuit 115A of the first handle body 11 by the second wireless communication circuit 125A, so as to transmit the control signals to the first control circuit 111 of the first handle body 11. Then, the control signals are transmitted to the first mobile device M1 by the first wireless communication circuit 115A for operation and control.

The first control circuit 111 and the second control circuit 121 are each a central processing unit (CPU), an application specific integrated circuit (ASIC) or a microprocessor. The first wireless communication circuit 115A and the second wireless communication circuit 125A are each a WI-FI communication unit, a BLUETOOTH communication unit, a ZIGBEE communication unit, a LoRa communication unit, a Sigfox communication unit or an NB-IoT communication unit. The first battery 114 and the second battery 124 are each a lithium ion battery, a lithium manganese battery, a lithium polymer battery, or a nickel hydrogen battery.

Third Embodiment

Figure 7:
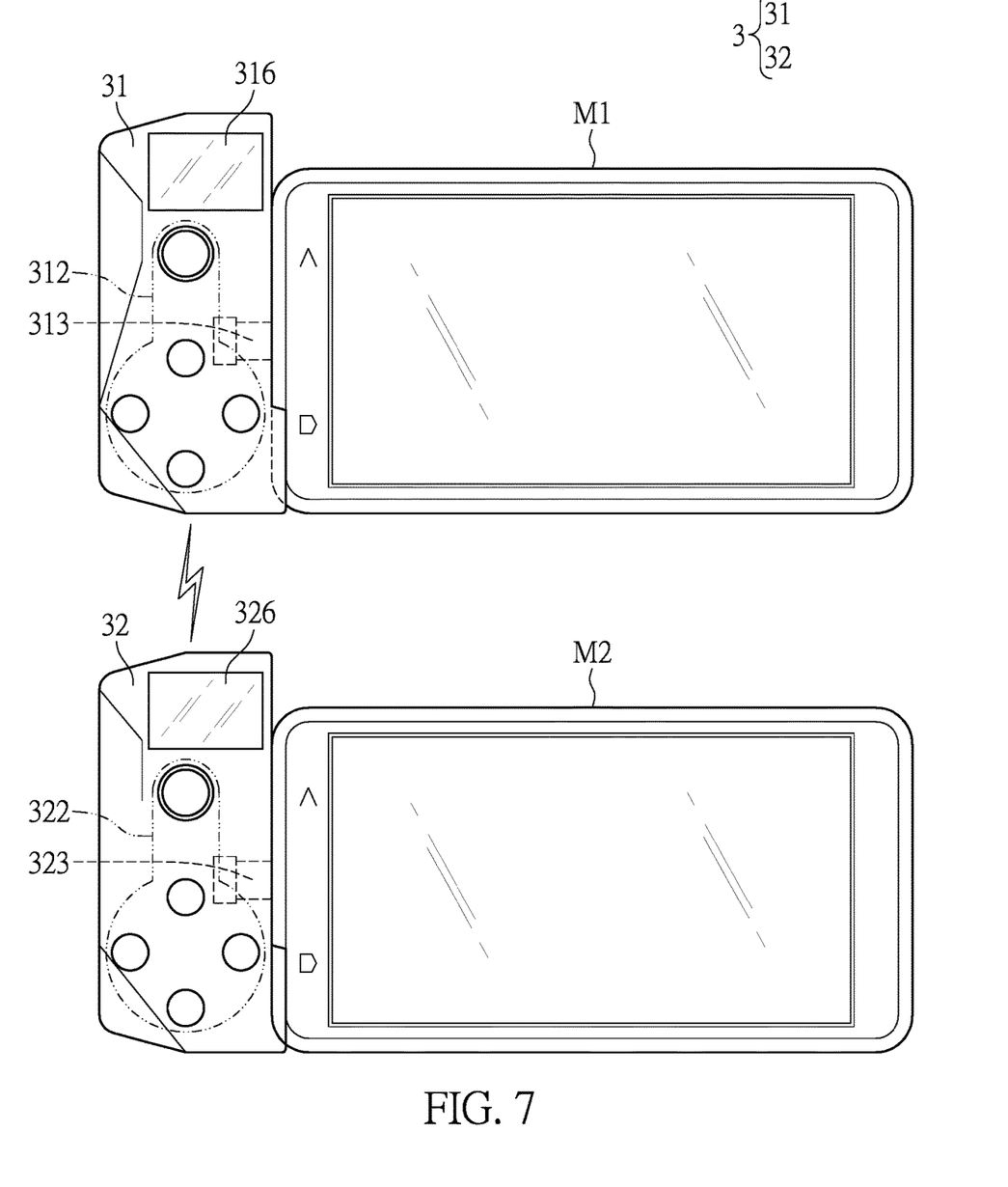
FIG. 7 is a schematic view of the first handle body and the second handle body of the game controller respectively cooperating with the first mobile device and a second mobile device according to a third embodiment of the present disclosure.
Figure 8:
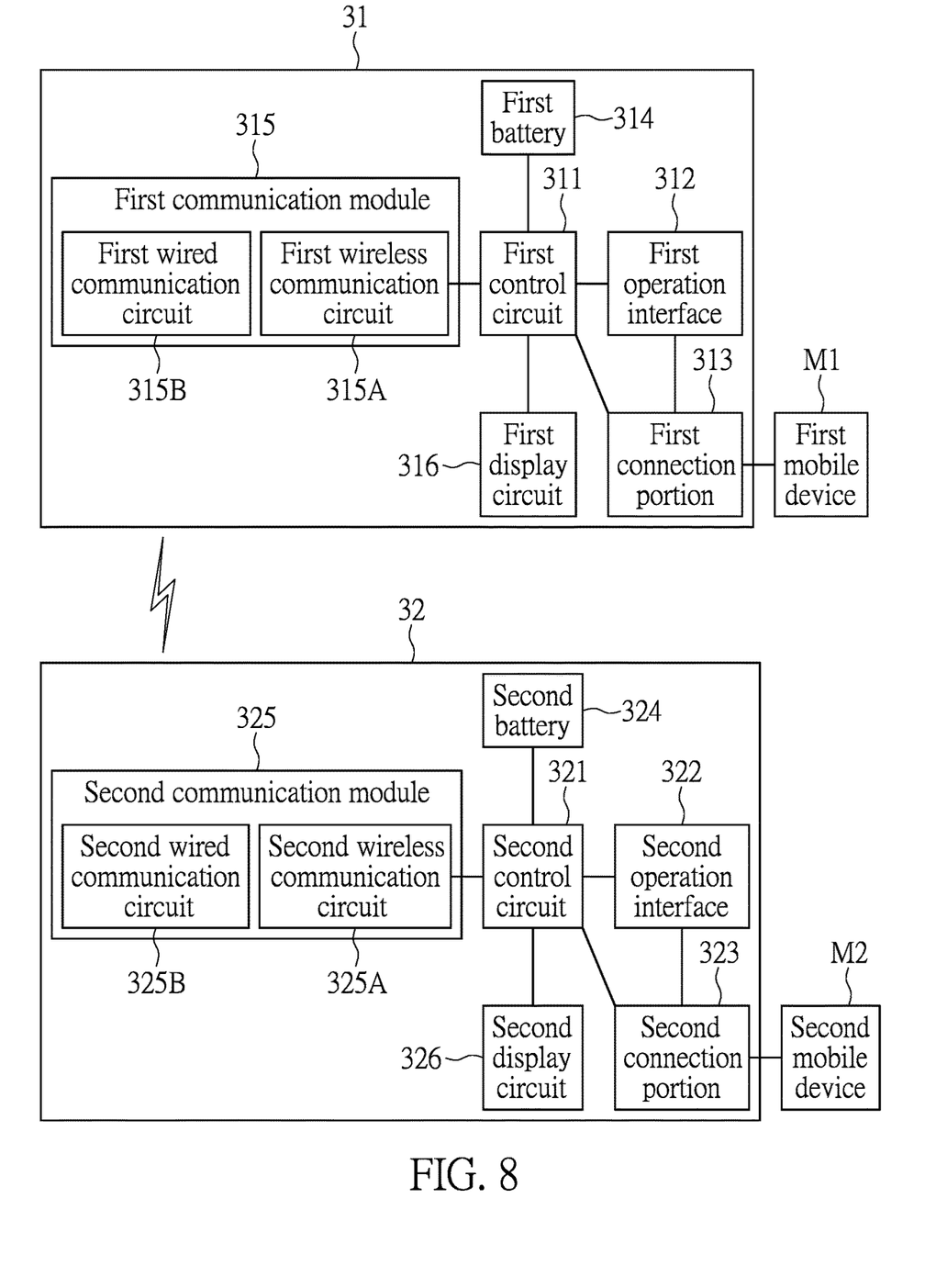
FIG. 8 is a functional block diagram of the first handle body and the second handle body of the game controller respectively cooperating with the first mobile device and the second mobile device according to the third embodiment of the present disclosure.

Referring to FIG. 7 and FIG. 8, FIG. 7 is a schematic view of a first handle body and a second handle body of a game controller according to a third embodiment of the present disclosure respectively cooperating with a first mobile device and a second mobile device. FIG. 8 is a functional block diagram of the first handle body and the second handle body of the game controller according to the third embodiment of the present disclosure respectively cooperating with a first mobile device and a second mobile device.

In this embodiment, a game controller 3 includes a first handle body 31 and a second handle body 32.

The first handle body 31 includes a first control circuit 311, a first operation interface 312, a first connection portion 313, a first battery 314, a first communication module 315, and a first display circuit 316. The first operation interface 312 is electrically connected to the first connection portion 313.

The first communication module 315 includes a first wireless communication circuit 315A and a first wired communication circuit 315B. The first control circuit 311 is electrically connected to the first communication module 315, the first battery 314, the first operation interface 312, the first connection portion 312, and the first display circuit 316.

The second handle body 32 includes a second control circuit 321, a second operation interface 322, a second connection portion 323, a second battery 324, a second communication module 325, and a second display circuit 326. The second operation interface 322 is electrically connected to the second connection portion 323. The second communication module 325 includes a second wireless communication circuit 325A and a second wired communication circuit 325B. The second control circuit 321 is electrically connected to the second communication module 325, the second battery 324, the second operation interface 322, the second connection portion 322, and the second display circuit 326.

In this embodiment, the first mobile device M1 and the second mobile device M2 are respectively used with the first handle body 31 and the second handle body 32.

The first mobile device M1 can be disposed at a side of the first handle body 31. The first handle body 31 has an accommodation space that the first connection portion 313 is disposed therein, and the first mobile device M1 is also disposed therein. Similarly, the second mobile device M2 can be disposed at a side of the second handle body 32. The second handle body 32 has an accommodation space that the second connection portion 323 is disposed therein, and the second mobile device M2 is also disposed therein.

Similar to the first and the second embodiments, the first handle body 31 and the second handle body 32 in this embodiment can also switch communication modules, so as to be connected to the mobile device in a wired manner or in a wireless communication manner.

Therefore, when the first handle body 31 is coupled to the first mobile device M1, and the second handle body is coupled to the second mobile device M2, the first handle body 31 communicates with the second wireless communication circuit 325A of the second communication module 325 by the first wireless communication circuit 315A of the first communication module 315, so as to transmit information. The transmitted information between the first handle body 31 and the second handle body 32 can be displayed by the first display circuit 316 and the second display circuit 326.

In this embodiment, each of the first display circuit 316 and the second display circuit 326 may be a liquid crystal display circuit, an organic light emitting diode display circuit, or a touch display circuit. In addition, inputting information into the first handle body 31 and the second handle body 32 can be performed in a handwriting manner, in a touch manner, or through the first operation interface 312 or the second operation interface 322.

The first control circuit 311 and the second control circuit 321 are each a central processing unit (CPU), an application specific integrated circuit (ASIC) or a microprocessor. The first wireless communication circuit 315A and the second wireless communication circuit 325A are each a WI-FI communication unit, a BLUETOOTH communication unit, a ZIGBEE communication unit, a LoRa communication unit, a Sigfox communication unit or an NB-IoT communication unit. The first battery 314 and the second battery 324 are each a lithium ion battery, a lithium manganese battery, a lithium polymer battery, or a nickel hydrogen battery.

Beneficial Effects of the Embodiments

In conclusion, the game controller provided by the present disclosure can be electrically connected to a mobile device to receive power and communicate with the mobile device. In addition, without being electrically connected to the mobile device, the game controller can still communicate with the mobile device, thereby expanding usage scenarios provided to a user. Furthermore, the game controller of the present disclosure can also be charged by the handle body at one side and be controlled by the handle body on another side. In addition, the two handheld bodies of the game controller of the present disclosure can each be paired with one mobile device. Information can also be transmitted between the two handle bodies. All of the above can greatly increase the usage scenarios of the game controller The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A game controller, being connected to a first mobile device, the game controller comprising:
    a first handle body, including:
        a first operation interface;
        a first connection portion, the first operation interface being electrically connected to the first connection portion;
        a first control circuit;
        a first battery; and
        a first communication module including a first wireless communication circuit and a first wired communication circuit, the first control circuit being electrically connected to the first communication module, the first battery, the first operation interface and the first connection portion;
    wherein the first mobile device is disposed at a side of the first handle body; wherein, when the first mobile device is electrically connected to the first connection portion of the first handle body, the first control circuit turns on the first wired communication circuit of the first communication module to be communicated with the first mobile device by the first connection portion.

2. The game controller according to claim 1, wherein the first mobile device charges the first battery by the first connection portion.

3. The game controller according to claim 1, wherein, when the first mobile device is not electrically connected to the first connection portion, a first mobile communication module of the first mobile device is capable of being in communication with the first communication module.

4. The game controller according to claim 1, further comprising a second handle body, the second handle body being coupled to the first handle body, the first mobile device being disposed between the first handle body and the second handle body.

5. The game controller according to claim 4, wherein the second handle body includes:
    a second operation interface;
    a second connection portion, the second operation interface being electrically connected to the second connection portion;
    a second control circuit;
    a second battery; and
    a second communication module including a second wireless communication circuit and a second wired communication circuit, the second control circuit being electrically connected to the second communication module, the second battery, the second operation interface, and the second connection portion.

6. The game controller according to claim 5, wherein, when a power value of the first battery of the first handle body is lower than a predetermined power value, and the first handle body is electrically connected to the first mobile device by the first connected portion, the first mobile device charges the first battery, and the first control circuit turns off the first wired communication circuit and the first wireless communication circuit of the first communication module; wherein the second handle body is in communication with the first mobile device by the second wireless communication circuit of the second communication module.

7. The game controller according to claim 5, wherein, when a power value of the second battery of the second handle body is lower than a predetermined power value, and the second handle body is electrically connected to the first mobile device by the second connection portion, the first mobile device charges the second battery, and the second control circuit turns off the second wired communication circuit and the second wireless communication circuit of the second communication module; wherein the first handle body is in communication with the first mobile device by the first wireless communication circuit of the first communication module.

8. The game controller according to claim 5, wherein, when the first handle body is connected to the first mobile device, and the second handle body is connected to a second mobile device, the first handle body uses the first wireless communication circuit of the first communication module to communicate with the second wireless communication circuit of the second communication module for information transmission.

9. The game controller according to claim 8, wherein the first handle body and the second handle body each include a display circuit to display information transmitted between the first handle body and the second handle body.

* * * * *